United States Patent
Aho et al.

(10) Patent No.: US 9,649,793 B2
(45) Date of Patent: May 16, 2017

(54) NEAR NET-SHAPE PANELS AND PROCESSES THEREFOR

(75) Inventors: Eric Joseph Aho, Cincinnati, OH (US); Curt Brian Curtis, Nesbit, MS (US); Scott Alan Garten, Liberty Township, OH (US); Randall Maurice Prather, Cincinnati, OH (US); James Timothy Sanchez, Los Lunas, NM (US); Michael Dominic Schulte, Montgomery, OH (US); Brian Dominic Stephens, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1149 days.

(21) Appl. No.: 13/332,456

(22) Filed: Dec. 21, 2011

(65) Prior Publication Data
US 2013/0045370 A1    Feb. 21, 2013

Related U.S. Application Data

(60) Provisional application No. 61/524,205, filed on Aug. 16, 2011.

(51) Int. Cl.
*B29C 44/06*  (2006.01)
*B29C 35/02*  (2006.01)
(Continued)

(52) U.S. Cl.
CPC .......... *B29C 44/06* (2013.01); *B29C 35/0266* (2013.01); *B29C 70/04* (2013.01);
(Continued)

(58) Field of Classification Search
CPC ............ B29C 44/0461; B29C 45/1642; B29C 45/1643
(Continued)

(56) References Cited

U.S. PATENT DOCUMENTS 3,520,769 A * 7/1970 Baker .................... B29C 44/04
                                                              206/523
3,872,199 A * 3/1975 Ottinger ....................... 264/46.4
(Continued)

FOREIGN PATENT DOCUMENTS

| CN | 101031610 A | 9/2007 |
| JP | 2003161109 A | 6/2003 |
| JP | 2006124697 A | 5/2006 |

OTHER PUBLICATIONS

Search Report and Written opinion for corresponding International Patent Application No. PCT/US2012/050229, dated Oct. 30, 2012.
(Continued)

*Primary Examiner* — Stella Yi
(74) *Attorney, Agent, or Firm* — General Electric Company; William Scott Andes

(57) ABSTRACT

Processes for producing near net-shape panels and panels formed thereby. The processes include forming a preform to comprise a stack of multiple plies that contain an uncured expandable foam material. The preform has regions that differ from each other by the number and/or volume of the plies therein. The preform and its plies are then cured within a restricted volume to produce a near net-shape panel. The curing step causes the expandable foam material to expand, and the restricted volume is sized so that the number and volume of the plies within the regions of the preform cause zones within the panel to have different densities and/or thicknesses.

17 Claims, 5 Drawing Sheets

(51) Int. Cl.
*F01D 11/12* (2006.01)
*B29C 70/04* (2006.01)

(52) U.S. Cl.
CPC ........... *F01D 11/122* (2013.01); *Y02T 50/672* (2013.01); *Y10T 29/49297* (2015.01); *Y10T 428/2495* (2015.01); *Y10T 428/249953* (2015.04)

(58) Field of Classification Search
USPC ......... 264/45.1, 45.5, 45.6, 45.8, 46.1, 46.5, 264/46.6, 46.7, 48, 642, 510, 241, 297.4
See application file for complete search history.

(56) References Cited

U.S. PATENT DOCUMENTS

| | | |
|---|---|---|
| 5,234,757 A | 8/1993 | Wong |
| 5,388,959 A | 2/1995 | Forrester et al. |
| 5,783,272 A | 7/1998 | Wong |
| 6,017,484 A | 1/2000 | Hale |
| 2002/0025423 A1 | 2/2002 | Dreher |
| 2002/0189195 A1 | 12/2002 | McKague |
| 2003/0042685 A1 | 3/2003 | Sanders et al. |
| 2008/0075587 A1 | 3/2008 | Lenk |
| 2009/0011063 A1 | 1/2009 | Davie |

OTHER PUBLICATIONS

Unofficial English translation of Chinese Office Action issued in connection with corresponding CN Application No. 201280039751.3 on Jul. 28, 2015.

Unofficial English Translation of Japanese office action issued in connection with corresponding JP Application No. 2014526086 on Aug. 30, 2016.

* cited by examiner

NEAR NET-SHAPE PANELS AND PROCESSES THEREFOR

CROSS REFERENCE TO RELATED APPLICATIONS

This application claims the benefit of U.S. Provisional Application No. 61/524,205, filed Aug. 16, 2011, the contents of which are incorporated herein by reference.

BACKGROUND OF THE INVENTION

The present invention generally relates to materials and processes suitable for producing components from preforms. More particularly, this invention relates to materials and processes by which preforms undergo compression, molding, and curing to produce panels, for example, an abradable panel suitable for use as an abradable seal in the fan section of a gas turbine engine.

Gas turbine engines generally operate on the principle of compressing air within a compressor section of the engine, and then delivering the compressed air to a combustor section of the engine where fuel is added to the air and the resulting air/fuel mixture is ignited. Afterwards, the resulting combustion gases are delivered to a turbine section of the engine, where a portion of the energy generated by the combustion process is extracted by a turbine rotor to drive the compressor section of the engine.

Turbofan engines have a fan at the front of the engine that compresses incoming air. A portion of the compressed air is delivered to the combustor section through the compressor section, while the remainder bypasses the compressor and combustion sections and instead is delivered via a bypass duct to the rear of the engine, where the bypassed air exits through a fan exit nozzle to produce additional thrust. In high bypass turbofan engines of types widely used in large aircraft operating at subsonic speeds, including those used by commercial airlines, the fan is relatively large and a larger portion of the compressed air flows through the bypass duct to produce most of the thrust generated by the engine. Accordingly, the operation of the fan has a significant impact on the thrust and specific fuel consumption (SFC) of high bypass turbofan engines. Reductions in SFC are important to airlines for the purpose of reducing airline operating costs.

In most turbofan engines, the fan is contained by a fan case that is equipped with a shroud. The shroud circumscribes the fan and is immediately adjacent the tips of the fan blades, such that the shroud serves to channel incoming air through the fan so that most of the air entering the engine will be compressed by the fan. However, a small portion of the incoming air is able to bypass the fan blades through a radial gap present between the tips of the fan blades and the shroud. In aircraft turbofan engines and particularly high bypass turbofan engines, SFC can be significantly affected by limiting the amount of air that bypasses the fan blades through this gap.

During the normal operation of an aircraft turbofan engine, the tips of the fan blades are very likely to rub the shroud. Rubbing contact between the fan blade tips and shroud tends to increase the radial gap between the shroud and the fan blade tips, thereby reducing engine efficiency. To mitigate damage to the blade tips from rub encounters, a portion of the shroud adjacent the fan blade tips is often covered with an abradable material capable of sacrificially abrading away when rubbed by the blade tips. The abradable material is often provided in the form of arcuate panels or sectors that are mounted to the shroud to define a continuous abradable seal that circumscribes the fan blades. Common abradable materials for use in fan sections of turbofan engines contain an expandable material that, during processing to form the abradable material, is expanded to have a substantially constant cross-sectional thickness ("radial thickness"). As described in U.S. Pat. No. 5,388,959, known abradable materials include low-density syntactic foam materials that contain an epoxy resin, micro-balloons, and a reinforcement material, for example, chopped fiberglass fibers.

The fan section, shroud and abradable panels are manufactured to achieve tolerances that minimize the initial radial gap between the fan blade tips and the surface of the abradable seal formed by the abradable panels. In some instances, these tolerances are intended to avoid any significant rubbing between the blade tips and abradable material. For example, minimal radial gaps may be achieved by reducing variations in the lengths of the fan blades, the radial location of the fan disk, or the fan case diameter. Furthermore, the inner surfaces of the abradable panels must typically be machined to achieve the diametrical dimensions required for the shroud assembly, particularly if the abradable material is of the type described above that expands during curing.

In additional to diametrical tolerances, to maintain desirable aerodynamic efficiencies associated with a small radial gap, abradable panels are often formed to achieve a desirable flowpath geometry through the creation of a surface contour that closely matches the contour of the fan blade tips. As an example, each abradable panel may be formed to have an axial profile so that when assembled within the shroud, the diameter defined by the radially inward surfaces of the panels immediately surrounding the fan blades decreases in the aft direction of the engine. However, if the abradable material is formed from an expandable foam material of a type described above, such that the abradable material initially has a substantially constant cross-sectional thickness, grinding or other suitable machining operations must be performed to produce the desired surface profile on the surfaces of the abradable panels. Inherently, this operation generates scrap material, increases raw materials cost, and increases labor costs. Another drawback of conventional expandable foam materials is that the expansion process typically creates a generally constant density throughout the abradable material, which may not be necessarily desirable for abradable panels used in the fan section of a turbofan engine.

In view of the above, it should be appreciated that improved performance of abradable panels for fan blade shrouds is constantly sought to improve the SFC of turbofan engines, as well as reduce material and labor costs. However, an ongoing challenge is the ability to achieve such improvements with abradable panels whose geometries must be consistently produced to have relatively complex axial profiles.

BRIEF DESCRIPTION OF THE INVENTION

The present invention provides processes for producing near net-shape panels, a nonlimiting example of which is an abradable panel suitable for use in the fan section of a turbofan engine. The panels are amenable to fabrication using automated processes, while also being capable of having relatively complex profiles and tailored density profiles.

According to a first aspect of the invention, a process of producing a near net-shape panel includes forming a preform to comprise a stack of multiple plies that contain an uncured expandable foam material. The preform is formed to have at least first and second regions that differ from each other by the number and/or volume of the plies therein. The preform and its plies are then cured within a restricted volume to produce the near net-shape panel. The near net-shape panel has first and second zones formed by the first and second regions of the preform, and the curing step causes the expandable foam material to expand. The restricted volume is sized so that the number and volume of the plies within the first and second regions of the preform cause the first and second zones of the near net-shape panel to have different densities and/or thicknesses.

A second aspect of the invention is a panel produced by a process comprising the steps described above. In a particular embodiment, the panel is one of a number of abradable panels adapted to be assembled together to form an abradable seal in a fan section of a turbofan engine. Such an abradable panel can be produced by a process that includes identifying a targeted shape having nominal dimensions for at least a first of the abradable panels. A preform is then formed to comprise a stack of multiple plies that contain an uncured expandable foam material. The preform has at least first and second regions that differ from each other by the number and/or volume of the plies therein. The plies are then cured within a restricted volume to produce the first abradable panel whose shape is substantially geometrically similar to the targeted shape but varies in size from the nominal dimensions of the targeted shape. The first abradable panel has first and second zones formed by the first and second regions of the preform. The curing step causes the expandable foam material to expand, and the restricted volume is sized so that the number and volume of the plies within the first and second regions of the preform cause the first and second zones of the first abradable panel to have different densities and thicknesses.

Another aspect of the invention is a near net-shape abradable panel adapted to form part of an abradable seal in a fan section of a turbofan engine. The near net-shape abradable panel includes first and second zones that have different densities and thicknesses. The abradable panel can be installed in a fan section of a turbofan engine so that the denser and thinner of the first and second zones defines an upstream portion of an abradable seal.

A technical effect of the invention is the ability to produce a panel, and particularly an abradable panel, having a near net-shape to reduce material and labor costs. Another advantage of the invention is the ability to produce such a panel to have a tailored density profile for the purpose of promoting certain mechanical or physical properties of the panel, for example, erosion resistance of an abradable panel.

Other aspects and advantages of this invention will be better appreciated from the following detailed description.

DETAILED DESCRIPTION OF THE INVENTION

Figure 1:
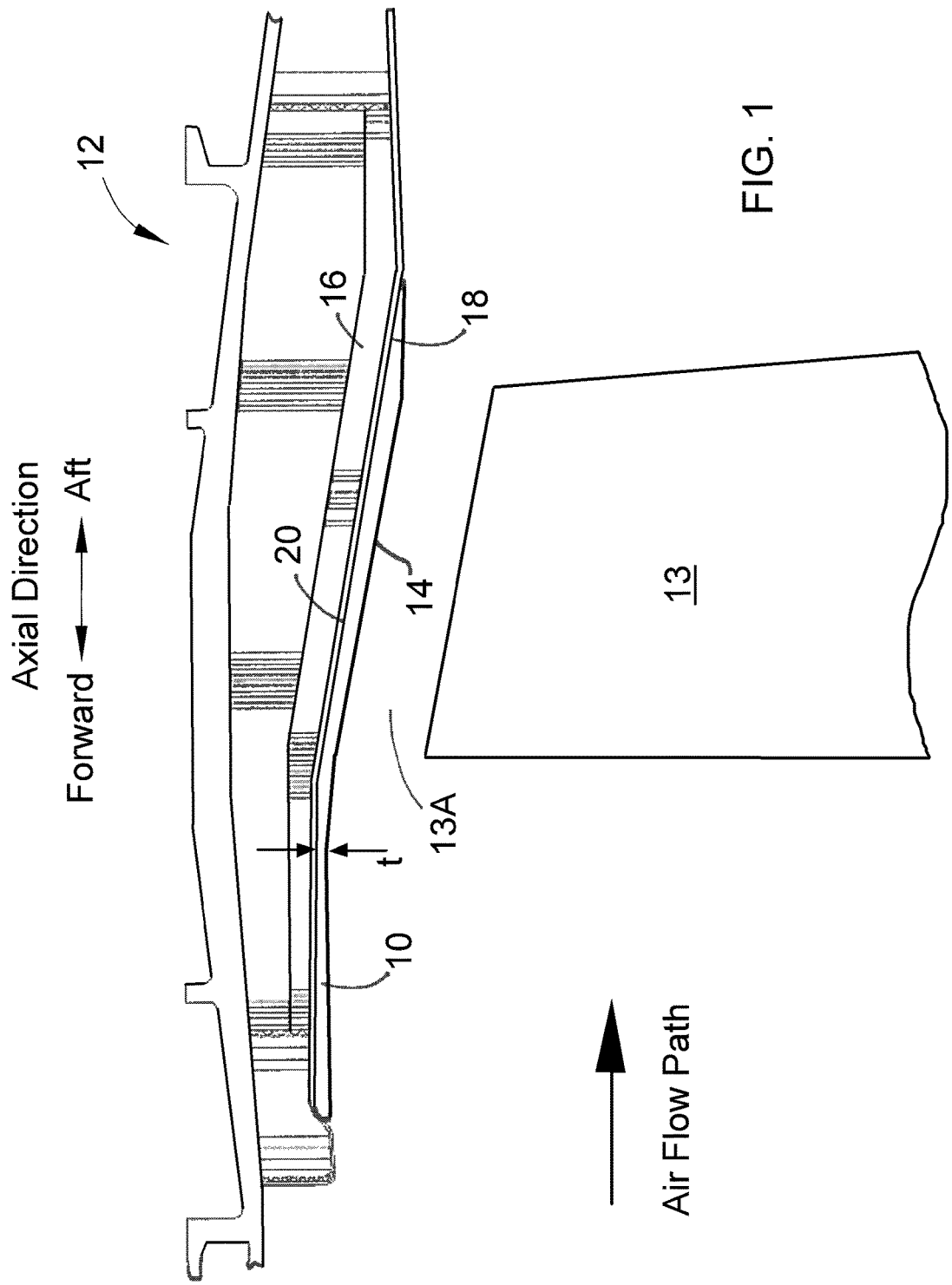
FIG. 1 is a cross-sectional view of an abradable panel installed in a fan section of a turbofan engine.
Figure 2:
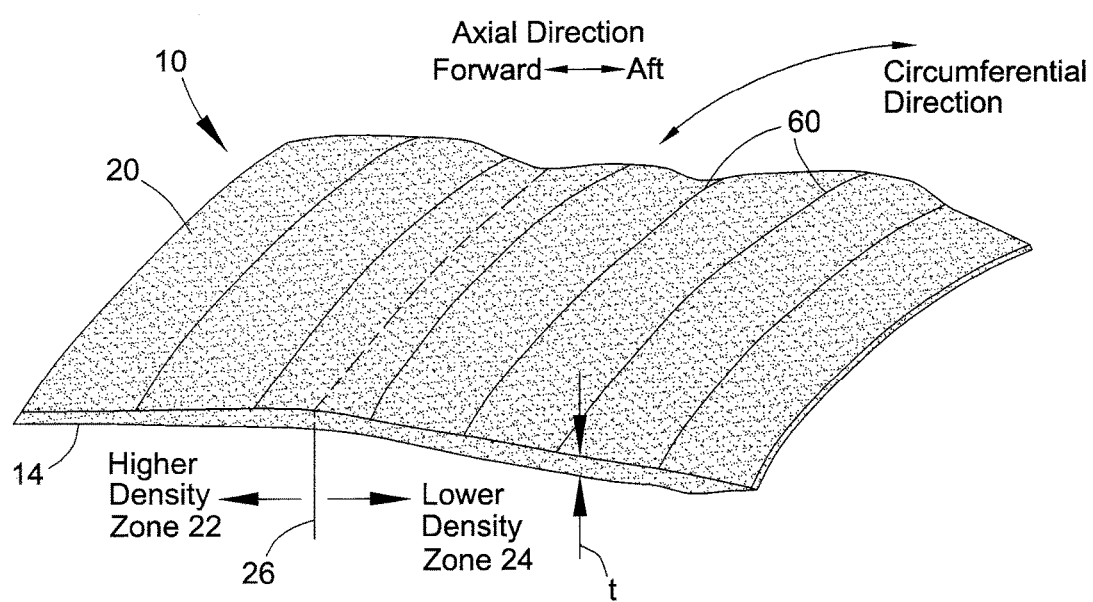
FIG. 2 is a perspective view of the abradable panel represented in FIG. 1.

FIGS. 1 and 2 schematically represent an abradable panel 10 of a type that can be used in a turbofan engine, and particularly a high bypass turbofan aircraft engine. Abradable panels of this invention are not limited to the configuration represented in FIGS. 1 and 2. From the following discussion, it should also become apparent that materials and processes of this invention are not limited to the fabrication of abradable panels, and that other applications for the materials and processes are within the scope of the invention.

As represented in FIG. 1, the panel 10 is part of a shroud assembly 12 that circumscribes rotatable blades 13 (of which a fragment of one blade is represented) within a fan section of a turbofan aircraft engine. As known in the art, the panel 10 may be one of a series of panels (sectors) that, when mounted with the shroud assembly 12, define a continuous abradable seal adapted to minimize the radial gap 13A with the tips of the fan blades 13 (the radial gap 13A is exaggerated for purposes of illustration). As such, the panel 10 has an arcuate shape in the circumferential direction indicated in FIG. 2, so that when the panel 10 is assembled with other panels a continuous annular-shaped abradable seal can be formed. As also evident from FIG. 1, the abradable panel 10 has a profiled surface 14 that defines an outer boundary of the air flow path through the fan section. The panel 10 is represented as being bonded to a support structure 16 along a bond line 18 located at a surface 20 of the panel 10 opposite the profiled surface 14. As seen in FIGS. 1 and 2, the panel 10 has a radial thickness (t) defined between its surfaces 14 and 20. The radial thickness of the panel 10 is not required to be uniform, and instead will typically vary in the axial direction, as represented in FIG. 1.

According to a preferred aspect of the invention, the abradable panel 10 is preferably produced from a preform to have a near net-shape, such that minimal machining of the panel 10 is necessary prior to installation in the shroud assembly 12. As used herein, "near net-shape" refers to a shape that is substantially geometrically similar to a targeted shape for the panel 10, but may vary in size due to the shape varying nominally from the final dimensions of the shape. According to another preferred aspect of the invention, regions within the abradable panel 10 may have different densities. In FIG. 2, such differences are represented by first and second density zones 22 and 24, though the presence of additional zones is foreseeable. FIG. 2 represents these zones 22 and 24 as being delineated by a line 26 oriented in the circumferential direction of the panel 10, though other orientations are possible and an abrupt demarcation is not required. Furthermore, the first density zone 22 is indicated as having a higher density than zone 24, though this particular relative placement of lower and higher densities within the panel 10 is not a requirement.

The ability to achieve different densities within different zones 22 and 24 of the panel 10 can be advantageous for the purpose of promoting one or more performance characteristics of the panel 10. For example, the densities within the zones 22 and 24, as well as the relative sizes and locations of the zones 22 and 24 within the panel 10, can be tailored to promote the erosion resistance of the panel 10. In particular, it may be desirable for the denser zone 22 to exhibit greater erosion resistance than the zone 24, in view of the denser zone 22 being located upstream of the zone 24, and optionally upstream of the blades 13, and therefore more susceptible to direct impingement from particles entering the engine.

The abradable panel 10 can be formed of a variety of materials, a notable example of which is an expandable and curable syntactic foam material that contains micro-balloons. While a variety of polymer-based materials could be used to produce the panel 10, preferred materials are, while uncured, shapeable and moldable, and in addition are capable of being formed into various complex geometrical shapes. For use in producing a panel 10 containing an abradable material suitable for an abradable seal, particularly notable materials are epoxy-based resin systems combined with catalysts (curatives/accelerants), fillers and fibers that contribute mechanical properties, and further combined with one or more blowing agents to yield an expandable foam material that can be expanded through the application of a thermal treatment. Suitable blowing agents include, but are not limited to, isobutane encapsulated in an acrylic copolymer, examples of which micro-spheres commercially available from Akzo Nobel under the name Expancel®.

Figure 3:
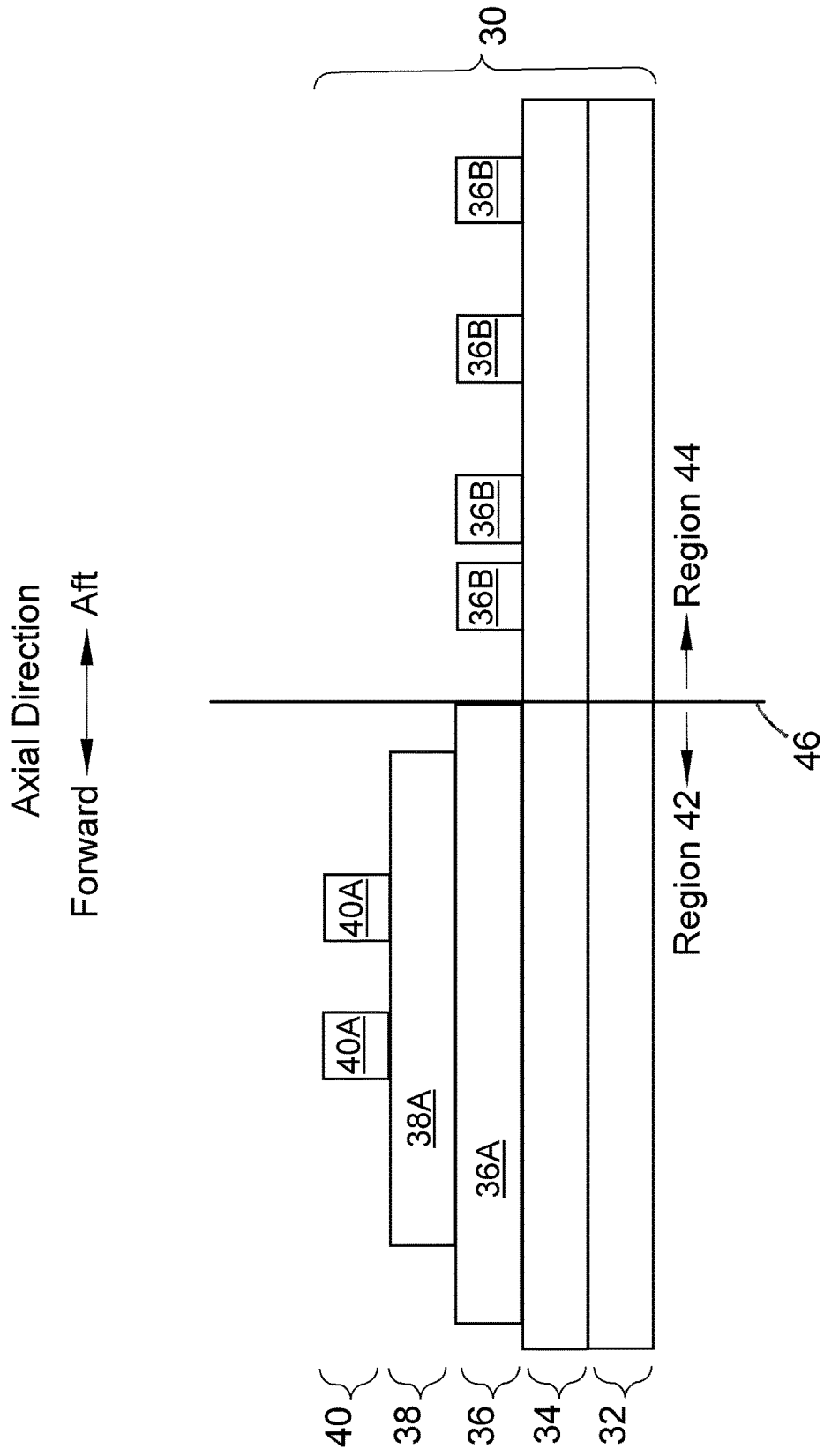
FIG. 3 schematically represents an un-expanded preform comprising a ply stack suitable for producing the panel of FIGS. 1 and 2.

FIG. 3 schematically represents a preform 28 of a type that can be used to produce the panel 10 of FIGS. 1 and 2. From the following discussion, it should be apparent that the configuration of the preform 28 represented in FIG. 3 is but one of a number of configurations that could be used to produce the panel 10. The preform 28 is represented as a stack 30 of multiple plies 32, 34, 36, 38 and 40 of uncured and unexpanded foam material, arranged so that the preform 28 contains two regions 42 and 44 separated by a line 46 that generally corresponds to the line 26 in FIG. 2. The foam material can be selected such that the plies 32-40 are individually drapable and the preform 28 as a whole is drapable, meaning that the preform 28 is sufficiently pliable to allow the preform 28 to readily conform over and around features in an uneven surface on which it is placed. Alternatively, the foam material can be chosen so that one or more of the plies 32-40 are sufficiently rigid to result in the preform 28 as a whole being non-drapable.

The use of an expandable foam material complicates the ability to achieve specific radial thicknesses (t) within the panel 10, as well as specific densities within different zones 22 and 24 of the panel 10. Nonetheless, according to one aspect of the invention, an approach to controlling the densities within the different zones 22 and 24 of the panel 10 is to vary the amount of uncured and unexpanded foam material within the regions 42 and 44 of the preform 28 that will form the zones 22 and 24 of the panel 10. In the nonlimiting example of FIG. 3, though the plies 32 and 34 within the regions 42 and 44 are represented as being continuous and roughly the same in volume (at least, in the radial-axial section of FIG. 3), the regions 42 and 44 do not contain the same number or amounts of the remaining plies 36, 38 and 40. The ply 36 is represented as containing four islands 36B of foam material within the region 44 and a single but larger island 36A of foam material that does not completely fill the ply 36 within the region 42. Furthermore, the region 44 does not contain any foam material corresponding to the plies 38 and 40, while the region 42 contains a single island 38A of foam material that does not completely fill the ply 38 within the region 42 and the outermost ply 40 is represented as containing two small islands 40A of foam material. As a result, the region 42 corresponding to the higher density zone 22 of the panel 10 contains a greater amount of unexpanded foam material than the region 44, which corresponds to the lower density zone 24. Furthermore, each of the regions 42 and 44 contain decreasing amounts of the foam material in the through-thickness direction away from the innermost ply 32.

The greater number and amounts of the plies 32-40 within the region 42, if expanded within a restricted volume during expansion and curing, would yield a greater density than would the fewer number and lesser amounts of the plies 32-40 of the region 44 if expanded to the same volume. In this case, the zone 22 produced with the region 42 would be denser than the zone 24 produced with the region 44. On the other hand, if the volume into which the region 44 is able to expand during curing were to be sufficiently restricted, the density of the zone 24 produced from the region 44 may be roughly equal to or even greater than the zone 22.

The degree to which the expandable foam materials of the preform 28 will expand in the absence of physical restrictions is related to several factors, including cure conditions that relate to the temperature and/or pressure profiles of a cure cycle or cycles, for example, temperature ramp rate, cure time, and holds. For example, if allowed to expand unrestricted, increasing the volumetric expansion of a given amount of an expandable foam material (such as through the use of higher cure temperatures and/or longer durations at elevated temperatures) will result in lower densities. On the other hand, if the volumetric expansion of an identical amount of the same foam material were to be suppressed (such as through the use of lower cure temperatures and/or shorter durations at elevated temperatures), greater densities will result.

In view of the above, another aspect of the invention is the ability to achieve different densities within the zones 22 and 24 of the panel 10 by subjecting the different regions 42 and 44 of the preform 28 to different curing treatments, including the use of different temperature and/or pressure profiles within the regions 42 and 44 during curing. This density-control technique can be used in combination with the non-uniform preform 28 of FIG. 3. Alternatively, as a nonlimiting example, the regions 42 and 44 of the preform 28 could be identically constructed, and yet the region 42 could be subjected to cure conditions capable of achieving a higher density level desired for the zone 22 of the panel 10, while the other region 44 of the preform 28 could be subjected to different cure conditions that achieve a lower density level within the other zone 24. In such an embodiment, differences in densities within the zones 22 and 24 would rely entirely on the use of different cure conditions within the regions 42 and 44.

Figure 4:
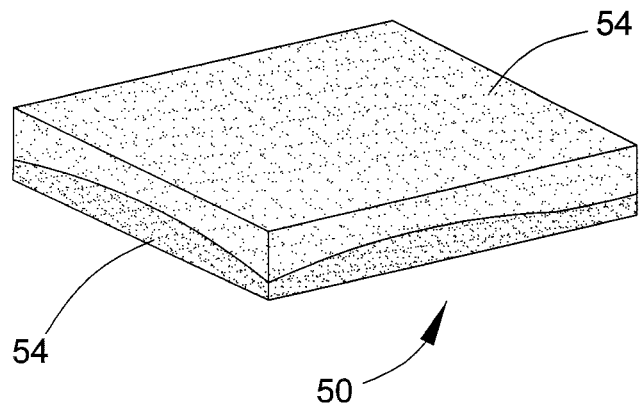
FIG. 4 schematically represents tooling suitable for shaping and curing the preform of FIG. 3 to produce the panel of FIGS. 1 and 2.
Figure 5:
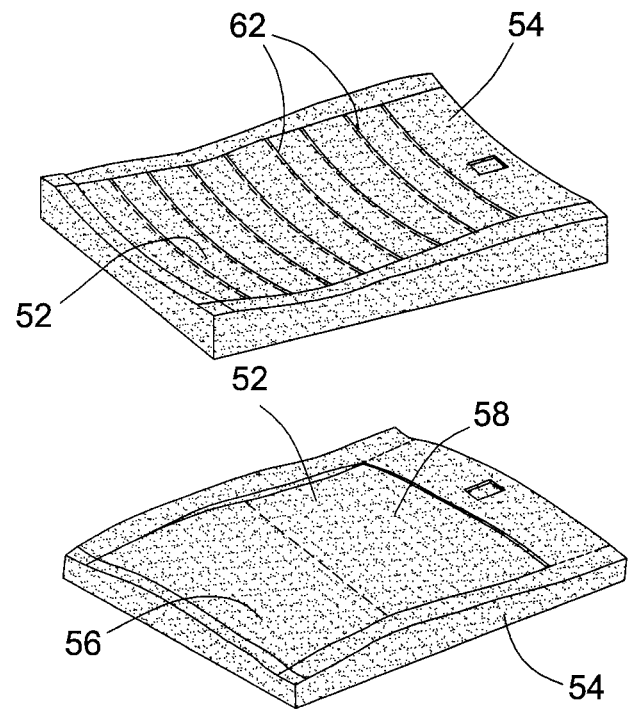
FIG. 5 is an exploded view of the tooling of FIG. 4.

Different cure conditions within the regions 42 and 44 can be achieved through the use of a variable cure cycle and/or tooling designs that result in different heat transfer rates to the regions 42 and 44. As a nonlimiting example, FIGS. 4 and 5 schematically represent tooling 50 that defines a mold cavity capable of producing the panel 10 of FIGS. 1 and 2 from the preform 28 of FIG. 3. The mold cavity is defined by complementary cavities 52 defined in opposing surfaces of two mold halves 54. According to a preferred aspect of the invention, the complementary mold cavities 52 cooperate to shape the preform 28 during curing to produce the near net-shape desired for the panel 10, so that machining, grinding and other post-curing operations are minimized. More particularly, the surfaces of the complementary cavities 52 are contoured to produce the desired thickness (t) of the panel 10 and the contoured profile desired for the abradable surface 14 of the panel 10. The cavities 52 provide a restricted volume in which the expandable foam material is able to expand during curing and, in doing so, not only defines the near net-shape profile desired for the panel 10, but also affects the density profile of the panel 10 produced in the mold 50 from the preform 28. As an example, the mold cavity can be sized such that the preform 28 of FIG. 3 will yield a panel 10 whose zone 22 is relatively dense and whose zone 24 is relatively thicker and less dense.

The mold 50 can be used to cure the preform 28 in combination with a variety of processes and equipment, including but not limited to ovens, autoclaves, platen presses, and direct heating of the mold 50. Appropriate cure conditions for such equipment will depend on the specific expandable foam material(s) used. As discussed above, cure condition parameters such as temperature ramp rates, cure time at the cure temperature, and hold times at intermediate temperatures, influence the volumetric expansion of the foam material of the preform, and are therefore capable of being used to influence the densities of the zones 22 and 24 within the abradable panel 10. By utilizing a non-uniform heating rate across the mold 50 or by varying the thickness of the mold 50, a preform within the mold 50 can be subjected to non-uniform heating rates that are capable of causing the expandable foam material to undergo different rates and/or degrees of volumetric expansion within the preform 28. By appropriately limiting the heating durations, different regions of the preform 28 can be subjected to different degrees of volumetric expansion within the restricted volume of the mold cavity. The mold cavities 52 represented in FIGS. 4 and 5 are indicated as having different regions 56 and 58, in which the regions 42 and 44 of the preform 28 are intended to be shaped and cured. Consistent with the above, different curing conditions can be controlled within these mold cavity regions 56 and 58 to produce the desired density or densities within the panel 10.

On the basis of the above, the thermal input into the mold 50 can be controlled to be uniformly or selectively applied to certain portions of the mold 50 to produce a panel 10 having different densities within various zones 22 and 24 from a preform 28 having different numbers and amounts of plies 32-40 (FIG. 3). Alternatively, the thermal input into the mold 50 can be selectively applied to certain portions of the mold 50 to produce a panel 10 having different densities within various zones 22 and 24 from a preform having equal numbers and amounts of plies 32-40. It is also possible for the thermal input into the mold 50 to be selectively applied to certain portions of the mold 50 to produce a panel 10 having a substantially uniform density from a preform 28 having different numbers and amounts of the plies 32-40 (FIG. 3).

The plies 32-40 of the preform 18 can be placed in the mold 50 using a hand lay-up process by which the plies 32-40 are arranged and/or stacked in a predetermined manner, for example, as depicted in FIG. 3. It is also envisioned that certain ingredients of the expandable foam material could be combined within the mold cavity to obtain the desired composition and properties of the foam material. Following the molding operation, the cured panel 10 can be visually inspected for voids or unfilled regions, which may be attended to in a suitable repair process.

Though only the radial (thickness) and axial directions of the preform 28 are visible in FIG. 3, evidencing the ability to tailor the densities of the panel 10 in the thickness and axial directions, densities in the circumferential direction of the panel 10 can also be achieved by varying the number and amounts of the plies 32-40 in the direction of the preform 28 corresponding to the circumferential direction (FIG. 2) of the panel 10. Furthermore, while FIG. 3 represents the preform 28 as containing only plies 32-40 of substantially equal thicknesses, the preform 28 could contain plies of different thicknesses and/or shapes, including films, strips, tubes, etc., which are further capable of altering the final densities of the zones 22 and 24 within the panel 10.

FIGS. 1 and 5 further represent the creation of channels 60 in the surface 20 of the panel 10 that will be bonded to the support structure 16 of the shroud assembly in FIG. 1. The channels 60 can be employed to promote the flow of adhesive and permit out-gassing during bonding of the panel 10 to the support structure 16. As represented in FIG. 5, the channels 60 can be formed during the curing process within the mold 50 by projections 62 that project into the cavity 52 that defines the surface 20 of the panel 10.

Figure 6:
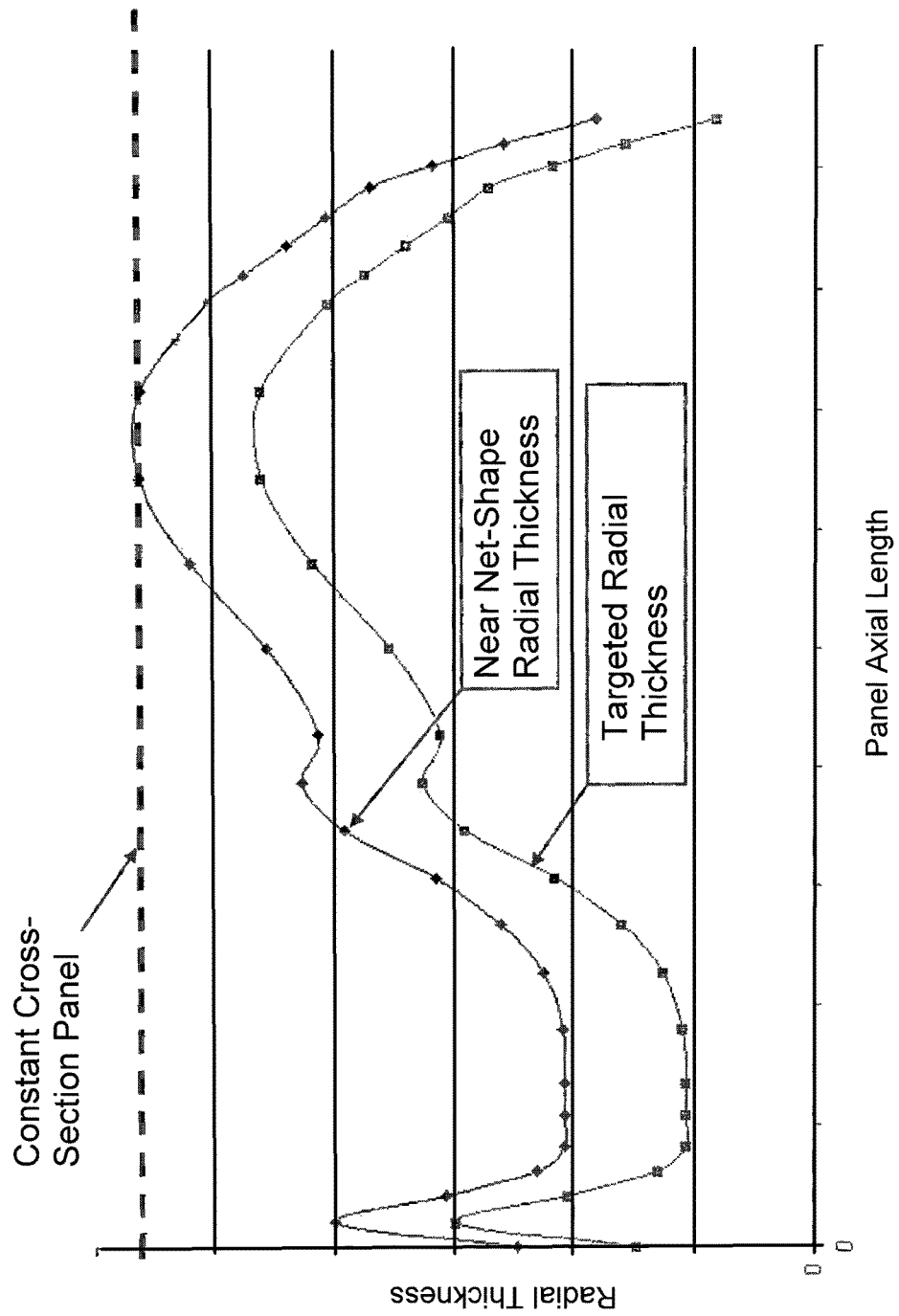
FIG. 6 is a graph that compares a targeted radial thickness for an abradable panel, a constant radial thickness that would be necessary to produce the panel using expandable foam materials and processes of the prior art, and a near-net radial thickness that can be achieved with materials and processes of the present invention.

FIG. 6 contains a graph that plots a targeted radial thickness for an abradable panel along the circumferential direction of the panel, and the radial thickness of a near-net shape panel produced from a non-uniform preform similar to what is shown in FIG. 3. From the graph, it can be seen that the targeted and actual radial thicknesses correspond well. In addition, the geometric shape of the near net-shape panel is also geometrically similar to the targeted geometric shape. Finally, FIG. 6 indicates the thickness of a constant cross-section panel produced in accordance with prior art practices, and evidences the significant amount of abradable material that would need to be removed in order for the prior art panel to have the targeted geometric shape.

While the invention has been described in terms of specific embodiments, it is apparent that other forms could be adopted by one skilled in the art. For example, the physical configuration of an abradable panel could differ from that shown, and materials and processes other than those noted could be used. Therefore, the scope of the invention is to be limited only by the following claims.

The invention claimed is:

1. A process for producing a near net-shape panel, the process comprising:
   forming a preform to comprise a stack of multiple plies that contain an uncured expandable foam material by placing the plies into a mold cavity using a hand lay-up process, the preform being formed to have at least first and second regions that differ from each other by the number and/or volume of the plies therein;
   closing the mold cavity to form a restricted volume; and then
   curing the plies within the restricted volume of the closed mold cavity to produce the near net-shape panel, the near net-shape panel having first and second zones formed by the first and second regions of the preform, the curing step causing the expandable foam material to expand, the restricted volume being sized so that the number and volume of the plies within the first and second regions of the preform cause the first and second zones of the near net-shape panel to have different densities and/or thicknesses.

2. The process according to claim 1, wherein the first and second zones of the near net-shape panel to have different densities.

3. The process according to claim 1, wherein the first and second zones of the near net-shape panel to have different densities and thicknesses.

4. The process according to claim 1, wherein the first region of the preform has a greater number and a greater volume of plies than the second region of the preform.

5. The process according to claim 4, wherein the first zone of the near net-shape panel is denser and thinner than the second zone.

6. The process according to claim 1, wherein during the curing step the first and second regions of the preform are subjected to at least one different curing condition so that the expandable foam material within the first and second regions of the preform expansion undergo different rates and/or degrees of volumetric expansion within the preform.

7. The process according to claim 1, wherein the curing step is performed in a mold and the restricted volume is a mold cavity within the mold.

8. A process for producing a near net-shape panel, the process comprising:
   forming a preform to comprise a stack of multiple plies that contain an uncured expandable foam material, the preform being formed to have at least first and second regions that differ from each other by the number and/or volume of the plies therein; and then
   curing the plies within a restricted volume of a closed mold to produce the near net-shape panel, the near net-shape panel having first and second zones formed by the first and second regions of the preform, the curing step causing the expandable foam material to expand, the restricted volume being sized so that the number and volume of the plies within the first and second regions of the preform cause the first and second zones of the near net-shape panel to have different densities and/or thicknesses;
   wherein the curing step is performed in a mold and the restricted volume is a mold cavity within the mold, and
   wherein the first and second regions of the preform are contained in first and second regions of the mold cavity, and the first and second regions of the mold cavity are heated at different rates during the curing step to cause the expandable foam material within the first and second regions of the preform to undergo different rates and/or degrees of volumetric expansion.

9. The process according to claim 1, wherein the panel is an abradable panel.

10. The process according to claim 9, further comprising installing the abradable panel as part of a shroud assembly in a fan section of a turbofan engine.

11. A process for producing abradable panels adapted to be assembled together to form an abradable seal in a fan section of a turbofan engine, the process comprising:
   identifying a targeted shape having nominal dimensions for at least a first of the abradable panels;
   forming a preform to comprise a stack of multiple plies that contain an uncured expandable foam material, the preform being formed to have at least first and second regions that differ from each other by the number and/or volume of the plies therein; and then
   curing the plies within a restricted volume of a closed mold to produce the first abradable panel, the first abradable panel having a shape that is substantially geometrically similar to the targeted shape but varies in size from the nominal dimensions of the targeted shape, the first abradable panel having first and second zones formed by the first and second regions of the preform, the curing step causing the expandable foam material to expand, the restricted volume being sized so that the number and volume of the plies within the first and second regions of the preform cause the first and second zones of the first abradable panel to have different densities and thicknesses.

12. The process according to claim 11, wherein the first region of the preform has a greater number and a greater volume of plies than the second region of the preform.

13. The process according to claim 12, wherein the first zone of the first abradable panel is denser and thinner than the second zone, the process further comprising installing the first abradable panel in the fan section of the turbofan engine so that the first zone defines an upstream portion of the abradable seal.

14. The process according to claim 13, wherein during the curing step the first and second regions of the preform are subjected to at least one different curing condition chosen from the group consisting of temperature ramp rates, cure times at the cure temperature, and hold times at intermediate temperatures so that the expandable foam material within the first and second regions of the preform expansion undergo different rates and/or degrees of volumetric expansion within the preform.

15. The process according to claim 11, wherein the curing step is performed in a mold and the restricted volume is a mold cavity within the mold.

16. The process according to claim 15, wherein the first and second regions of the preform are contained in first and second regions of the mold cavity, and the first and second regions of the mold cavity are heated at different rates during the curing step to cause the expandable foam material within the first and second regions of the preform to undergo different rates and/or degrees of volumetric expansion.

17. A process for producing a near net-shape panel, the process comprising:
   forming a preform to comprise a stack of multiple plies that contain an uncured expandable foam material by placing the plies into a mold cavity using a hand lay-up process, the preform being formed to have at least first and second regions that differ from each other by the number and/or volume of the plies therein;
   closing the mold cavity to form a restricted volume; and then
   curing the plies within the restricted volume of the closed mold cavity defined by complementary cavities defined in opposing surfaces of two mold halves to produce the near net-shape panel, the near net-shape panel having first and second zones formed by the first and second regions of the preform, the curing step causing the expandable foam material to expand, the restricted volume being sized so that the number and volume of the plies within the first and second regions of the preform cause the first and second zones of the near net-shape panel to have different densities and/or thicknesses.

* * * * *